Jan. 10, 1950  F. A. DE MAESTRI  2,493,752
PROCESS OF PRODUCING MAGNESIUM HYDROXIDE
Filed March 6, 1948  2 Sheets-Sheet 1
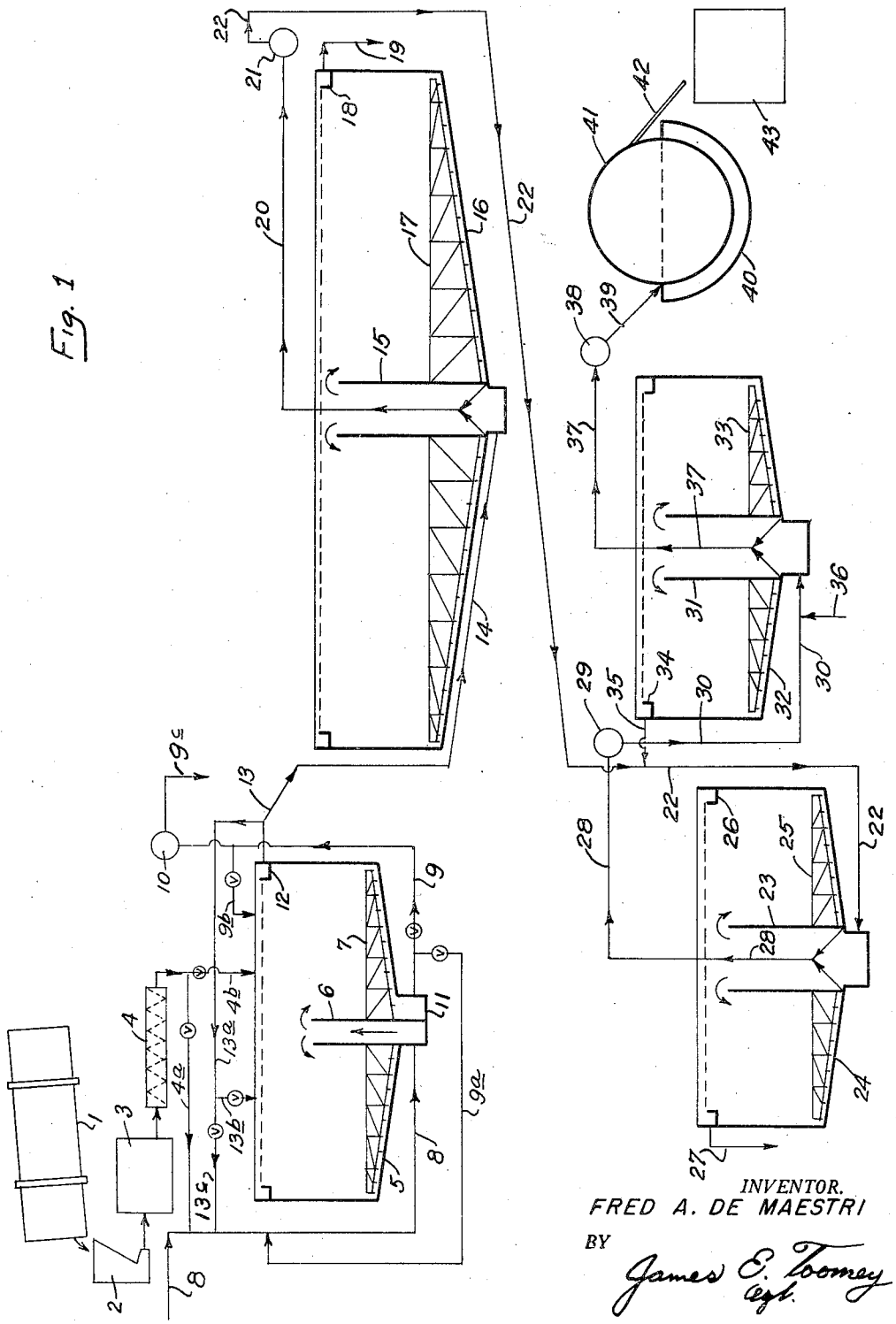
INVENTOR.
FRED A. DE MAESTRI
BY
James E. Toomey

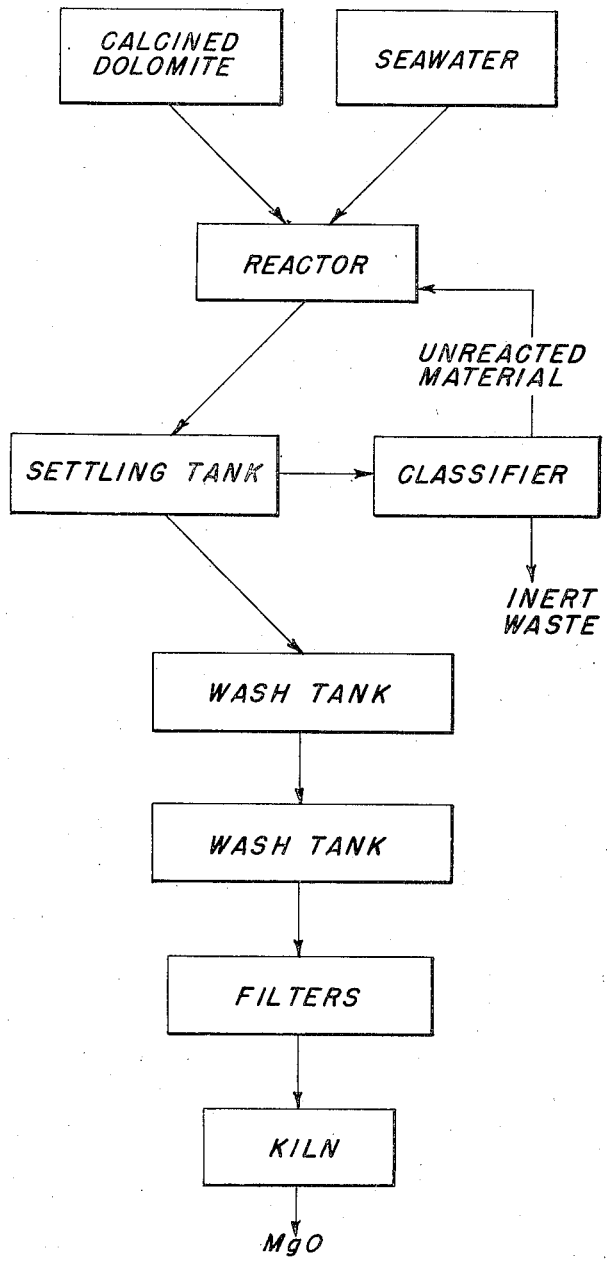

Patented Jan. 10, 1950

2,493,752

UNITED STATES PATENT OFFICE 2,493,752

PROCESS OF PRODUCING MAGNESIUM HYDROXIDE

Fred A. De Maestri, Burlingame, Calif., assignor to The Permanente Metals Corporation, Oakland, Calif., a corporation of Delaware Application March 6, 1948, Serial No. 13,357

5 Claims. (Cl. 23—201)

This invention relates to the production of magnesium hydroxide, and, further, to the production of magnesia. More particularly, it relates to a method of treating seawater with calcined dolomite to produce a rapidly settling and easily filterable crystalline precipitate of magnesium hydroxide, and it further relates to a method of recovering a highly purified magnesia, or magnesium oxide.

This application is a continuation-in-part of my co-pending applications, Serial No. 452,745, filed July 29, 1942, now abandoned, and Serial No. 545,484, filed July 18, 1944, now abandoned.

Although seawater has long been known to contain magnesium salts and to be, therefore, a possible and an almost inexhaustible source of magnesium values such as magnesium oxide, it has not been commercially utilized as such source until very recent times, because of the costs of processing such dilute solutions and difficulties in obtaining fairly dense and sufficiently well-crystallized precipitates. Various processes have been proposed to overcome these difficulties and also to produce a purer product.

In recovering magnesium values from naturally-occurring, or manufactured, solutions containing them it has been the general practice to add to such solutions lime or calcined dolomite in the form of slurries or of the hydrated reagent. Very early workers in this field have added dry reagent to the solution and have recovered the separated solids, but this technic was later discarded in most operations in favor of the slurry or hydrated product because it was believed that granular reagent was not sufficiently reactive.

The reaction of such slurries or hydrated materials with magnesium salt solutions has been satisfactorily rapid, but has resulted in precipitates which are very slow to settle and difficult to filter. Furthermore, when either the dry material or the hydrated or slurried material has been added, the product recovered has contained practically all of the impurities of the reagent, because all of the solids have been recovered together. The only exception to this has been an operation where it has been proposed to make a slurry of the lime or calcined dolomite, and then to wet-screen to remove silica, unburned cores and the like. Thereupon the screened slurry has been reacted, with all the disadvantages attendant upon the reaction of such slurries. Alternatively, it has been proposed to react brines, which contain high concentrations of magnesium ions, with granular lime, or to add such concentrated solutions to granular lime or granular calcined dolomite. In such operations there are, necessarily, high concentrations of the magnesium ions and also of the hydroxyl ions, which leads to a rapid deposition of magnesium hydroxide, in a form in which it is slow to settle and difficult to filter. Also, there is no separation of impurities.

According to this invention, it has now been found that magnesium hydroxide of high purity and excellent settling and filtering characteristics is obtained by continuously treating seawater in a reaction zone with dry, calcined dolomite of from 20 to 200 mesh particle sizes, allowing coarser unreacted dolomite particles to pass downwardly through the liquid being treated, and drawing off the resultant magnesium hydroxide slurry from the unreacted particles. The process also includes recycling the unreacted particles to the reaction zone, and intermittently withdrawing the settled unreacted particles, or continuously withdrawing part of these particles, to waste. The magnesium hydroxide slurry which is drawn off can in part be returned to the reaction zone, and in part is settled or thickened in a separate zone or successive zones, simultaneously washed by counter-current washing with fresh water, and filtered. The filtered product, if desired, is calcined to magnesia, and when so processed yields a magnesia of uniformly high purity. Alternatively, the filtered product can also be dried in any desired manner to obtain a dry, crystalline magnesium hydroxide of excellent quality and purity.

The calcined dolomite useful in this invention can be obtained by calcining dolomite, and crushing and sizing, or it can be crushed, calcined and sized. The calcined dolomite should substantially all pass 20 mesh screen and substantially all be retained on a 200 mesh screen (U. S. Bureau of Standards). Preferably, a major proportion of the dolomite particles should pass 48 mesh and be retained on 100 mesh.

In this process, the particles of calcined dolomite are introduced into the reaction zone which contains a mass of untreated seawater, which flows in from a feeding reservoir, and preferably there is also added an amount of previously treated seawater which contains, therefore, previously precipitated magnesium hydroxide crystals. The dolomite particles settle through the liquid while it is agitated and are more or less completely reacted, depending upon their sizes. The seawater and precipitated magnesium hydroxide are thus progressively classified from the calcined dolomite, and the larger unreacted particles of the latter are removed from the reaction zone by withdrawal from the bottom of the tank enclosing the reaction zone. In other words, the lime hydrates and goes into solution as the particle falls through the water. Agitation and the downward motion of the particle as well carry the calcium hydroxide and the subsequent precipitate of magnesium hydroxide away from the vicinity of the particle. More surface of the particle is therefore exposed to the solubilizing action of the seawater as it falls. It is believed that the presence in the particle of magnesia, probably hydrated at least in part, may also have a favorable effect on the quality or behavior of the magnesium hydroxide produced in the reaction zone.

At intervals, depending upon the analysis of the settled solid particles, or in a continuous manner, the solids are diverted to waste. It has been discovered in this process that the silica and $R_2O_3$ impurities concentrate in the material which settles to the bottom of the reaction zone and which for convenience is termed "reactor rejects." It is to be understood that this material is recycled in the system and is actually rejected only partially or at intervals. In the intermittent process, when the silica content of the rejects rises to between 15% and 25%, the rejects are sent to waste. Alternatively, a small stream of solids is continuously drawn off—small compared to the circulating stream, and depending upon the amount of impurities present. It has been found that the silica content of the magnesium hydroxide produced is decreased to about 1.0% to 1.5% or even less, by such removal of part of the coarse material, whereas if no material were rejected in the reactor, or in the first settling tank, the silica content of the product, except when using a very high-purity dolomite, would be well above 2.0%, and probably would be closer to 2.5% or higher. These higher percentages are quite objectionable in many used for the magnesia product. The $R_2O_3$ likewise is reduced to about 0.5% or less, and the settled solids withdrawn to waste show an $R_2O_3$ content of over 2.0%, where the calcined dolomite feed contains about 0.53% $R_2O_3$. This process is particularly advantageous in preventing silica and $R_2O_3$ contamination in the final product when using lower-grade dolomites in the feed; and it provides a means of classifying off these impurities with dolomite feed of any commercial quality.

When the reaction is carried out in a rolling barrel, the slurry of precipitate is drawn off continuously, and the heavier solid particles collect at the end of the barrel and are removed, in whole or in part, at intervals or continuously, to separate off impurities. Alternatively, with whatever apparatus may be employed in the reaction zone, the slurry and solid reactant can be withdrawn to a settling zone, and the heavier solids classified off in this zone, or prior to entry thereto, or after leaving the same. The removed solids can, if desired, be further classified in a separate zone, the portion containing the higher percentage of silica and other impurities sent to waste and the unreacted material returned to the reaction zone, or system. In these alternative processes, therefore, a selective removal of impurities is also achieved.

Furthermore, the present process provides an especially advantageous crystallization system. It is essential in the precipitation of magnesium hydroxide that the precipitate be crystalline, as is well-known, because a gelatinous precipitate cannot effectively be separated from the other components of the starting solution. Further, it is desired that the crystalline precipitate be in such condition that it settles rapidly and filters easily.

In a crystallizing system, the rate of crystallization is a function of the supersaturation of the solution, and of the crystal surface present in the system. It is desirable to have a considerable amount of crystal surface present in the system to accommodate deposition of new precipitate. A high supersaturation will favor rapid crystallization with the deposition of many new nuclei, i. e., of a large proportion of very small, or cryptocrystalline, material difficult to filter and slow to settle. It is desired to control the rate of crystallization so that formation of a large proportion of new nuclei is avoided, and so that supersaturation and crystal surface (old nuclei) are so balanced that a rapidly settling material is produced.

The rate of flow past the crystal surface is immaterial above a critical value, so that, when a crystal surface is provided for deposition of hydroxide in the present system, agitation of the liquid can be maintained at a fairly rapid rate, taking care only not to exceed the rate at which the unreacted solid feed particles will settle to the bottom of the reactor. Agitation can suitably be provided by recirculation of material by means of centrifugal pumps and by rakes at the bottom of the reactor.

It has been found that the rate of crystallization of magnesium hydroxide is maintained at the level which provides a rapidly settling and easily filterable precipitate, by following the procedural steps described above. Although, as in the case of most chemical processes of this nature, no absolutely uncontrovertible theory can be advanced to explain these results, it is believed that the following discussion of the mechanism of the process is a logical explanation for such results.

Excessive supersaturation is prevented in this system by adding the dry dolomite, of particle sizes shown, to the liquid to be reacted, because this step provides a slow increase of hydroxyl ions. That is to say, the lime first must hydrate to give $Ca(OH)_2$, this in turn dissolves in the surrounding liquid, and, due to the relative motion of solid and liquid, the dissolved material is dispersed and local high concentration of OH ions is prevented. This is essential because supersaturation is a function of hydroxyl ion concentration and of magnesium ion concentration (the latter being provided by the seawater), and it is necessary to control supersaturation in order to control rate of crystallization. If this becomes too rapid, many new nuclei form, and the result is a slow settling, difficultly filterable precipitate. In this process, and using feed of the particle sizes shown, the dissolution of hydroxyl ions is maintained at a slow rate and such ions are well dispersed, so that favorable conditions are maintained for adequate crystallization rates. With particle sizes of less than 200 mesh the calcined dolomite reacts very rapidly, yielding a magnesium hydroxide precipitate of less desirable physical characteristics, closely approaching the characteristics of magnesium hydroxide made by reacting lime or dolomite slurries with seawater.

Furthermore, in addition to controlling dissolution and dispersion of the hydroxyl ion, the present process also provides an amount of old nuclei, or of crystal surfaces, to accommodate deposition of newly formed magnesium hydroxide, because some treated liquid is recycled along with the rejects as well as the recycled overflow, both of these treated liquids containing already-precipitated crystalline magnesium hydroxide. However, because of the above-described control of supersaturation, or of hydroxyl ion concentration and dispersion, the amount of old nuclei present in the reaction zone can be relatively quite small, and the volume of treated liquid recycled may be as low as one-half or one-third the total volume of liquid flowing through the reaction zone.

In still further explanation of an alternative practice of this process, the magnesium ion concentration is also controlled because an appreciable volume of treated liquid overflow is recycled and agitation is effected. The magnesium ion concentration in the reaction zone is approximately that of the liquid carrying the magnesium hydroxide suspension which passes out at the overflow.

It is therefore a condition of operation of the present process that agitation be practiced, because this prevents high local concentration of hydroxyl ions, and of magnesium ions, does not deleteriously affect deposition of newly formed magnesium hydroxide on resident crystal surfaces, and insures dispersion of old crystal nuclei throughout the reaction zone. This agitation is effected by the movement and recycling of solid particles and treated liquid by means of vigorously-acting pumps, such as centrifugal pumps and other suitable pumps, for instance, with or without the assistance of rakes or other agitation means in the reaction zone. Alternatively the desired agitation can be effected by stirring means wholly within the reaction zone.

Conventional types of apparatus may be employed in carrying out the invention. It has been found advantageous to use a reactor which permits selective treatment of the dolomite particles in order to more completely react the available lime in the dolomite. Hydroseparators, hydroclassifiers and rolling barrels each comprise apparatus useful in performing the selective treatment step.

The drawings and the following detailed description will more completely illustrate the carrying out of the invention.

Figure 1 is a schematic diagram of one method of an apparatus for carrying out the process of this invention; Figure 2 is a flowsheet of another method of carrying out this invention.

In the embodiment of Figure 1, the apparatus shown comprises a kiln 1, discharging into a bin 2 from which material is delivered into a crusher or grinding mill 3. Mill 3 discharges into an enclosed screw conveyor 4 which may discharge by pipe or chute 4b into a reactor or hydroseparator tank 5. Preferably, the calcine is introduced by pipe or chute 4 into a pipe 8 carrying incoming seawater. Tank 5 is provided with a deflector cylinder 6, a rake 7 adjacent its bottom and an inlet pipe 8 for admitting seawater to tank 5, at the upper portion thereof, through cylinder 6. A draw-off pipe 9, provided with a pump 10, is connected to a sump 11 at the bottom of tank 5, for removing the sludge. All or part of the sludge is returned to feed pipe 8 by pipe 9a, or if desired to reactor 5 by pipe 9b. A small proportion of the sludge can be continuously sent to waste by way of pipe 9c; or the reject sludge can be entirely sent to waste intermittently, for instance, at intervals when the silica content rises to about 25%. In this way the silica and $R_2O_3$ are removed, and the amount of these impurities present in the final magnesium hydroxide or oxide is reduced to a minimum. Tank 5 may be provided adjacent its top with an overflow trough or launder 12 from which extends a pipe 13 discharging into a feed line or conduit 14 opening into the lower end of a deflector cylinder 15 which opens into the upper portion of a settling thickener tank 16. Alternatively, the launder may be dispensed with, so that the discharge pipe 13 withdraws material directly from the tank. Alternatively, also, instead of withdrawing the entire overflow to the settling tank or thickener, one-third to one-half of its volume can be returned to pipe 8 by pipes 12a and 13c or to the reactor 5 by pipe 13a and 13b.

Tank 16, like tank 5, has its bottom inclined downwardly from its circumference to its central area, as shown, and is provided, adjacent its bottom, with a rake 17, and, adjacent its top, with a launder 18 from which a pipe 19 opens to waste. A pipe 20, branched at its lower end, opens into tank 16 at the bottom thereof, through cylinder 15, and is connected to the intake of a suitable pump 21. A pipe 22 discharges from pump 21 into the lower end of a deflector cylinder 23 of a wash tank 24. Tank 24 has an inclined bottom and is provided, adjacent its bottom, with a rake 25 and, adjacent its top, with a launder 26 from which a pipe 27 leads to waste. A pipe 28, branched at its lower end, leads from tank 24 at the bottom thereof, through cylinder 23, to the intake of a suitable pump 29 which discharges, through a pipe 30, into the lower end of a deflector cylinder 31 of a second wash tank 32. Tank 32 has an inclined bottom and is provided adjacent its bottom, with a rake 33 and, adjacent its top, with a launder 34 from which a pipe 35 discharges into pipe 22 leading to the lower end of cylinder 23 of tank 24, and is also provided with a fresh water pipe 36 delivering fresh water to the lower end of cylinder 31. A pipe 37 branched at its lower end, leads to the intake of a suitable pump 38 which discharges, through a pipe 39, into a filter 40 having a rotating cylinder or drum 41 and an associated scraper plate 42 discharging into a rotary kiln 43. The tanks may be similar to what is known as the Dorr syphon-feed tank and are, of course, provided with known means for rotating the rakes at desired speed, and the filter may be an Oliver type filter.

In the example of the method of this invention illustrated by Figure 1, the seawater is preferably pretreated or sweetened before it enters the reactor or hydro-separator tank 5. This sweetening step is a conventional one and is intended to remove carbon dioxide and bicarbonates present in the seawater. It is accomplished by adding small quantities of either slaked lime or slaked calcined dolomite to the seawater. Also, ferric chloride, chlorine gas and hypochlorite salts may be added as a part of this sweetening treatment. The fresh water supplied to tank 32 also preferably is pretreated or sweetened in a known manner, much the same as the treatment of the seawater. Crushed raw dolomite is fed to kiln 1, wherein it is calcined at a temperature of approximately 1200° C. and the carbon dioxide, water and other volatile constituents of the raw dolomite are driven off, converting the dolomite to the double oxide of calcium and magnesium (CaO·MgO). The dry calcined dolomite is discharged into a mill 3 wherein it is finely ground until substantially all of the dolomite attains a particle size sufficient to pass through 20 mesh and be retained on 200 mesh and a major proportion falls between 48 and 100 mesh. The pulverulent calcine is fed by conveyor 4 to the seawater in tank 5, or, preferably, in pipe 8. Slaking and reaction begin at once and continue as the mixture enters the reactor and the dolomite particles settle toward the bottom. A sludge of lime, silica and other insoluble and unreacted material settles out in sump 11. The sludge, containing a portion of the original feed to the reactor, is recycled to the reactor or to the feed line 8.

In the reaction that occurs upon admixture of the dry calcined dolomite and the seawater, magnesium hydroxide is formed, which has a very low solubility coefficient and therefore precipitates. Soluble calcium chloride is formed also. Primarily, as described above, the lime of the dolomite hydrates to form calcium hydroxide which has appreciable solubility and provides, in this manner, a slow increase in hydroxyl ion concentration. The agitation is effected, in this case, by the recirculation of the sludge, which is suitably recycled by means of a centrifugal pump, as shown at 10. The revolving rake 7 also aids agitation. Alternatively agitation can be effected wholly within the reaction zone by a suitable stirring or agitating device. The agitation prevents high local concentrations of hydroxyl and magnesium ions, and apparently holds to a low level the formation of new nuclei.

The precipitated magnesium hydroxide and reacted seawater overflows into launder 12 and is carried by pipe 13 to the bottom of tank 16, where it flows upwardly through cylinder 15 and passes into the main portion of the tank which serves as a thickener. The precipitate is compressed or thickened, being agitated rather mildly by rake 17, which revolves. Spent seawater flows to waste through launder 18 and pipe 19. The thickened sludge is carried off by pipe 20, pump 21 and pipe 22 to the bottom of tank 24. Washing water from tank 32 enters pipe 22 also prior to its debouching into tank 24, and the mixed sludge and wash water flows upward through cylinder 23 into the tank 24 and is agitated by rake 25, the sludge being further compressed and thickened, finally passing out through pipe 28, pump 29 and pipe 30 to the bottom of tank 32, and the spent wash water flowing to waste by way of launder 26 and pipe 27. Alternatively, this wash-water can be conducted into tank 16 to wash the sludge therein contained, in the manner of the washing conducted in tanks 32 and 34, and thereafter be sent to waste. Fresh water for washing is introduced through pipe 36 into pipe 30 and the mixed sludge and wash water flows up through cylinder 31 into the body of tank 32, where it is agitated by rake 33, the sludge further being compressed, and the used wash water is conducted by way of launder 34 and pipe 35 to pipe 22 as above described. The washed sludge is led from tank 32 by way of pipe 37, pump 38 and pipe 39 to filter 41, and then may be either dried, or calcined to MgO, as desired. The magnesium hydroxide precipitated in this method is crystalline and upon examination by X-ray diffraction shows the brucite structure.

Figure 2 is a flowsheet of an embodiment of this invention wherein dry, calcined "Natividad" dolomite of particle size predominantly passing 48 mesh and retained on 100 mesh is mixed with seawater in a reactor, which may be a tank fitted with a rake or other agitating device. The seawater may, if desired, first be sweetened as described with reference to Figure 1. The slurry resulting from the reaction between the dolomite and the seawater, and containing precipitated magnesium hydroxide and unreacted material is pumped out of the reactor to a settling tank. In the settling tank the inert and unreacted material is removed; alternatively, it can be removed before entering the settling tank, or after leaving the same, but in any case its particle size is such that it can be selectively removed, either by wetscreening or by classification. The material so removed is preferably classified in such manner that the unreacted material is sent back to the reactor and the inert material, or impurities, goes to waste. In an alternative method, the inert impurities can be intermittently separated in the manner described with reference to Figure 1.

In the process of this invention, substantially complete reaction of the lime is obtained. Only about 82% to 86% of the available magnesium of the seawater is reacted, however, in order to prevent appreciable precipitation of gypsum. It has been found to be advantageous to add the calcinated dolomite in the heated state, for instance, at from 400° C. to 900° C. as the reaction goes more rapidly in this manner. The particle size, or grind, of the calcinated dolomite is one of the most critical factors involved. Too fine material, below 200 mesh, reacts too rapidly, with the disadvantages given above and too large material reacts too slowly and has other disadvantages. Table I shows the washed final density of sludge as obtained with calcinated dolomite feed of the particle size ranges indicated, in a series of batch tests which are indicative of relative results obtained in continuous operations. It will be noted that the density decreases sharply with feed particles passing 200 mesh, while desirable high densities are obtained with feed larger than this, and in these tests maximum density occurs with the feed passing 65 and retained on 100 mesh.

*Table I*

| Test | Calcined Dolomite Feed, Particle Size | Sludge Density Grams per liter |
|---|---|---|
| A | +35 mesh | 102 |
| B | −35, +65 mesh | 110 |
| C | −65, +100 mesh | 131 |
| D | −100, +200 mesh | 104 |
| E | −200 mesh | 59 |

In these tests, calcinated dolomite of the particle sizes shown was added with agitation to sweetened seawater in an amount sufficient in each test to react about 85% of the available magnesium of the seawater, and the mass then allowed to settle. When the settled sludge was filtered, the filter cake in tests A to D inclusive averaged 26.3%, while test C was 29.6%, and E contained only 23.9%, of MgO. A difference of a few percent in such an instance is quite significant in a process such as this where quantities on the order of 5,000 gallons per minute of seawater are introduced into the reactor tank and well in excess of 100 tons of MgO are produced in a single day's operation. The settling rates of the initial precipitates in these tests are comparable to the sludge density results; that is, in these tests, test C is the fastest settling, A, which is the slowest in the preferred range, settles less than half as rapidly as C, and the settling rate of E is about one-third as fast as C.

The tables below show typical rates of reaction of mixtures of various sizes of calcinated dolomite of a kiln run grade and seawater when reacted according to the invention and where the calcinated dolomite has the following analysis:

|     | Per Cent |
| --- | --- |
| CaO | 53.70 |
| MgO | 30.11 |
| CO2 | 9.72 |

Molal ratio CaO/MgO 1.28, available lime 41.40%.

*Percent reaction of dolomite*

| Time | 20-28 mesh | 35-48 mesh | 65-100 mesh |
| --- | --- | --- | --- |
| 0 | .0 | .0 | .0 |
| 10 | 16 | 44 | 74 |
| 20 | 47 | 75 | 89 |
| 30 |  |  | 97 |
| 40 | 58 | 98 |  |
| 60 | 66 | 94 |  |
| 90 | 72 |  |  |
| 120 | 90 |  |  |
| 150 | 93 |  |  |
| 180 | 99 |  |  |

The above reactions were carried out by gently agitating a known quantity of the various sized dolomites in five gallons of seawater, being careful to allow an excess of magnesium ion to always be present in the seawater even after the dolomite had been completely reacted. As the reaction proceeded samples of liquor were removed and analyzed for soluble magnesia, the reaction rates being followed by measuring the rapidity with which the dolomite removed the magnesium ion from the seawater. After the magnesium ion removal had become nil, the solids were immediately analyzed for free lime to verify whether or not the dolomite had completely reacted and reverted to magnesium hydroxide.

As can be seen from the above table, the 20 to 28 mesh material is only 16% reacted in ten minutes contact time with seawater, while under duplicate conditions the 35 to 48 mesh material was 44% reacted, and the 65 to 100 mesh material 74% reacted. Likewise, the 20 to 28 mesh material took 120 minutes of reaction time to reach 90% while the 35 to 48 mesh material took about 40 minutes and the 65 to 100 mesh took 30 minutes.

The calcined dolomite feed useful in this invention is of a particle size to pass 20 mesh (U. S. Bureau of Standards) and be retained on 200 mesh, and preferably a maximum proportion should pass about 48 mesh and be retained on 100 mesh. Below 200 mesh, the dolomite feed reacts to give a low-density sludge resembling that obtained with a slurry. When a completely hydrated, but dry, calcined dolomite constitutes 75% of the feed to the reactor and the other 25% of the feed is a slurry of calcined dolomite in water, the rate of reaction is such as to provide only 10.6% to 11.9% solids as Mg(OH)$_2$ in the sludge going to the the filters, and only 27.4% to 29.2% Mg(OH)$_2$, or 15.5% to 20.2% MgO, in the filter cake; as contrasted with 12.2% and up of Mg(OH)$_2$ in the sludge, and 29.5% to 37.5% Mg(OH)$_2$, or 20.4% to 26.0% Mg, in the filter cake when adding dry, calcined dolomite according to this invention, and with recycling as described. These are results observed in plant-scale tests over a continuous period of 14 months, and also of similar investigations at a later date. When a slurry of calcined dolomite in water made up over 50% of the dolomite fed to the seawater, the resulting sludge, after washing and thickening, contained only 6% to 7% Mg(OH)$_2$, and the filter cake, 18.9 to 20.1% MgO.

As a further example of the method of carrying out this invention, calcined "Natividad" dolomite of particle sizes to pass through screens of 65 mesh and be mostly retained on 100 mesh, and of a composition after calcining of approximately 57% CaO, 40% MgO and nearly 3% impurities, was added while dry to sweetened seawater. The mixture flows into a reactor tank where it is thoroughly agitated. The larger unreacted particles settle out and are drawn off at the bottom of the reactor, and are recycled to the reactor or to the seawater feed line continuously. At the end of every 4 to 5 hours, the sludge of particles at the base of the reactor is sent to waste for about 15 minutes. The precipitated magnesium hydroxide slurry, being lighter, is drawn off from the top of the reactor to a thickener. When about 5000 gals. per minute of seawater are fed to the reactor, about 4000 gals. per minute of overflow from the reactor are recycled to the seawater feed line or to the reactor, providing a supply of crystals, or old nuclei, to the precipitating zone.

The slurry, as stated, flows to a thickener where the magnesium hydroxide settles to a denser sludge and the spent seawater is withdrawn to waste. The sludge is further washed with fresh water in successive thickeners, and is then filtered on rotary filters, and the filter cake is calcined to magnesia in a rotary kiln. The magnesia obtained contains 97.5% magnesium oxide, 1.3% calcium oxide and 1.2% of other impurities.

By the process described above, which includes adding to seawater dry, calcined dolomite of particle sizes passing 20 mesh and retained on 200 mesh, and a major proportion being between 48 and 100 mesh, and preferably between 65 and 100 mesh, agitating while the dolomite particles settle through the seawater, and by withdrawing inert and unreactive residue from the reaction system, there is obtained a fast-setting and readily filterable sludge and a highly purified product of reaction. In the specification and claims, percentages are by weight unless otherwise indicated. The expression R$_2$O$_3$ is a conventional means of designating sesquioxides, including particularly Fe$_2$O$_3$, Al$_2$O$_3$, B$_2$O$_3$, or those most usually found in seawater.

I claim:

1. A process of precipitating a fast-settling sludge of magnesium hydroxide from seawater which includes directly adding to seawater having a magnesium salt content of less than one percent, dry, calcined dolomite having a particle size of less than 20 mesh and greater than 200 mesh and a major proportion being between 48 and 100 mesh, in an amount so related to the volume of seawater as to make possible substantially complete reaction of the lime of said dolomite, agitating the reaction mixture in a reaction zone while reaction between dolomite particles and seawater takes place to form magnesium hydroxide and while unreacted dolomite particles having concomitant impurities entrained therein settle through said seawater in said zone, withdrawing magnesium hydroxide slurry from the upper portion of said zone, withdrawing said settled dolomite particles from the bottom of said zone, and recycling at least a portion of said withdrawn dolomite particles to said zone.

2. Process as in claim 1 wherein the recycled particles are introduced into the seawater simultaneously with calcined dolomite feed.

3. In a continuous process of precipitating a fast-settling sludge of magnesium hydroxide from seawater which includes directly adding to seawater having a magnesium salt content of less than one percent, dry, calcined dolomite having a particle size of predominantly less than 65 mesh and greater than 100 mesh, in an amount so related to the volume of seawater as to react substantially all of the lime of said dolomite and agitating the reaction mixture in a reaction zone while reaction between dolomite particles and seawater takes place to form magnesium hydroxide and while unreacted dolomite particles having concomitant impurities entrained therein settle through said seawater in said zone, the steps which comprise withdrawing a slurry of said magnesium hydroxide from the upper part of said zone, withdrawing said settled dolomite particles from the bottom of said zone, recycling said withdrawn dolomite particles to said zone until the silica content of said dolomite particles is between 15% and 25% by weight, and then removing said withdrawn dolomite particles from the reaction system.

4. In a continuous process of precipitating a fast-settling sludge of magnesium hydroxide from seawater which includes directly adding to seawater having a magnesium salt content of less than one percent, dry, calcined dolomite having a particle size of less than 20 mesh and greater than 200 mesh and a major proportion between 48 mesh and 100 mesh, in an amount so related to the volume of seawater as to react substantially all of the lime of said dolomite and agitating the reaction mixture in a reaction zone while reaction between dolomite particles and seawater takes place to form magnesium hydroxide and while unreacted dolomite particles having concomitant impurities entrained therein settle through said seawater in said zone, the steps which comprise withdrawing a slurry of said magnesium hydroxide from the upper part of said zone, withdrawing said settled dolomite particles from the bottom of said zone, recycling a major proportion of said withdrawn dolomite particles to said reaction zone, and continuously sending a minor proportion of said dolomite particles to waste.

5. A process of precipitating a fast-settling sludge of magnesium hydroxide from seawater which includes directly adding to seawater, having a magnesium salt content of less than one per cent, dry, calcined dolomite having a particle size of less than 20 mesh and greater than 200 mesh and a major proportion being of between 48 and 100 mesh, in an amount so related to the volume of seawater as to make possible substantially complete reaction of the lime of said dolomite, agitating the mixture of dolomite and seawater in a reaction zone while the reaction between the dolomite particles and seawater takes place to form magnesium hydroxide and while unreacted dolomite particles having concomitant impurities entrained therein settle through said seawater in said zone, withdrawing magnesium hydroxide slurry from the upper part of said zone, and recycling at least a portion of said dolomite particles to said reaction zone and discarding to waste another portion thereof withdrawn from the bottom of said zone.

FRED A. DE MAESTRI.

REFERENCES CITED

The following references are of record in the file of this patent:

UNITED STATES PATENTS

| Number | Name | Date |
|---|---|---|
| 2,124,002 | Mastin | July 19, 1938 |
| 2,234,367 | Chesny | Mar. 11, 1941 |
| 2,281,477 | Chesny | Apr. 28, 1942 |
| 2,354,584 | Elkington et al. | July 25, 1944 |

Certificate of Correction

Patent No. 2,493,752　　　　　　　　　　　　　　　　　　　　　　　　January 10, 1950

FRED A. DE MAESTRI

It is hereby certified that error appears in the printed specification of the above numbered patent requiring correction as follows:

Column 9, line 69, for "20.4% to 26.0% Mg" read *20.4% to 26.0% MgO;* and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*